United States Patent
Suguta et al.

(10) Patent No.: US 7,248,548 B2
(45) Date of Patent: Jul. 24, 2007

(54) AUDIO PLAYER

(75) Inventors: Seigo Suguta, Osaka (JP); Ichiro Kawashima, Osaka (JP); Hiroyuki Goto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/498,756

(22) Filed: Aug. 4, 2006

(65) Prior Publication Data

US 2007/0058499 A1    Mar. 15, 2007

(30) Foreign Application Priority Data

Sep. 9, 2005   (JP) ............................. 2005-262043

(51) Int. Cl.
  *G11B 15/52* (2006.01)
  *G06F 17/00* (2006.01)
(52) U.S. Cl. ...................................... 369/47.15; 700/94
(58) Field of Classification Search ..................... None
  See application file for complete search history.

(56) References Cited

U.S. PATENT DOCUMENTS 5,615,194 A * 3/1997 Kimura et al. ........... 369/47.29
5,970,031 A * 10/1999 Huang et al. ............. 369/44.28

FOREIGN PATENT DOCUMENTS

JP    2001-155432    6/2001

* cited by examiner

*Primary Examiner*—Andrew L. Sniezek
(74) *Attorney, Agent, or Firm*—McDermott Will & Emery LLP

(57) ABSTRACT

When underflow of a sub-Q data table occurs, a sub-Q data processing section does not read and output sub-Q data but outputs only audio data. Moreover, to achieve consistency between audio data and the sub-Q data in terms of buffer management, an input processing section includes respective counters for managing respective input data amounts of the audio data and the sub-Q data. Then, the input processing section executes management so that overflow and underflow of the sub-Q data table are suppressed as much as possible and a switch changes an IEC output mode at a time of audio processing and a time of dubbing. Thus, sound deterioration, and error recording in equipment to which the audio player is connected, and the like can be prevented.

8 Claims, 6 Drawing Sheets

AUDIO PLAYER

BACKGROUND OF THE INVENTION

The present invention relates to digital signal processing techniques in a broad sense, and particularly relates to a method for managing audio data and sub-Q data in equipment capable of receiving a digital audio from the outside and a method for outputting such data.

In a music CD, sub-Q data which is different data from audio data is recorded in a sub-coded Q channel. Such sub-Q data is used for reproduction time display and pause detection in dubbing. Conventionally, a system in which in reproducing a music CD, audio data and sub-Q data are synchronized and then output has been known (see Japanese Laid-Open Patent Publication No. 2001-155432).

In recent years, equipment capable of handling not only optical disc reproduction but also external digital audio input has been widely spread. Digital audio from the outside is received in the format defined in IEC 60958 or IEC 61937. When some audio processing is performed to the received data, audio data has to be extracted from an IEC format. In the IEC format, besides audio data, auxiliary information such as a channel status and user data is added. When such information is used for reproduction, the auxiliary information has to be extracted with the audio data. The extracted audio data and the extracted auxiliary data are managed in different buffers, respectively. When the extracted audio data and the auxiliary data are internally processed and then are output in the IEC format again, extracted and separated data have to be encoded.

When sub-Q data contained in user data is processed in receiving digital audio from the outside, a reproduction state of connected equipment is not known by receiver equipment, the receiver equipment has to be operated in a sub-Q input mode at all the time. However, when data from some other media than a music CD is being reproduced by connected equipment, sub-Q data does not exist in user data. When the music CD is reproduced, a music CD definitely contains sub-Q data and, therefore, there arises no problem. When data from the outside is received, however, the case where sub-Q data is not received has to be taken into consideration so that the occurrence of a problem such as sound deterioration can be avoided even in such case. Once audio data and auxiliary information are separated from each other, a timing difference is generated. Accordingly, it is difficult to precisely synchronize between the audio data and the auxiliary data and then output the synchronized data in the IEC format again. Therefore, when an output of the audio player is used with some external equipment connected thereto for the purpose of dubbing, track management might be wrongly performed in the external equipment.

In the above-described known system, when sub-Q data in user data is processed in receiving digital audio from the outside, it is highly possible that sound deterioration occurs. Moreover, audio data and sub-Q data are once separated from each other to perform audio processing, so that even if the audio data and sub-Q data are encoded again in an output stage, a timing difference is generated. Therefore, in the known system, when the audio player is used for dubbing of a music CD, a problem in which a detection point between tracks varies in receiver equipment arises.

SUMMARY OF THE INVENTION

It is therefore an object of the present invention to solve the above-described problems and provide an audio player which includes an interface capable of specifying an IEC output mode and thus achieves general versatility.

To achieve the above-described object, an audio player according to the present invention is so configured to have the function of detecting underflow of sub-Q data. To achieve consistency between audio data and sub-Q data in terms of buffer management, an input processing section of the audio player includes counters for managing respective input amounts of the audio data and the sub-Q data. Moreover, the audio player is configured so that an audio processing mode and a through mode can be selected from the outside of a reproduction section.

In the audio player of the present invention, a sub-Q data table is managed so that overflow and underflow thereof are prevented. Also, an IEC output mode is changed at a time when audio processing is performed and at a time when dubbing is performed. Thus, sound deterioration, error recording in equipment to which the audio player is connected, and the like can be prevented. Moreover, a method for outputting an IEC output can be externally selected, so that a system with general versatility can be achieved.

DESCRIPTION OF THE PREFERRED EMBODIMENTS

Hereafter, embodiments of the present invention will be described with reference to the accompanying drawings.

Figure 1:
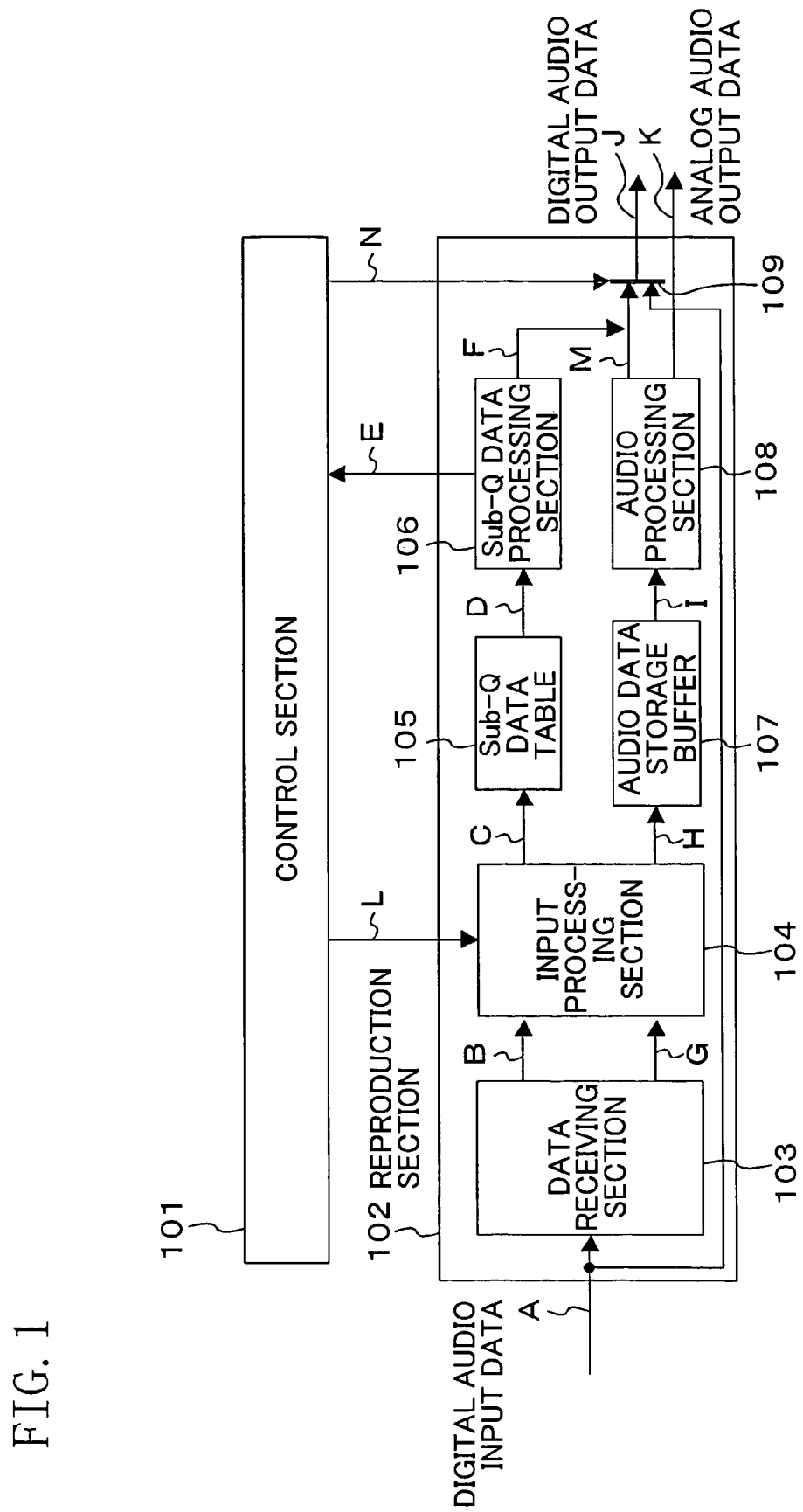
FIG. 1 is a block diagram illustrating an exemplary configuration of an audio player according to the present invention.

FIG. 1 is a block diagram illustrating an exemplary configuration of an audio player according to the present invention. The audio player of FIG. 1 includes broadly two parts, i.e., a control section 101 and a reproduction section 102. The reproduction section 102 includes a data receiving section 103, an input processing section 104, a sub-Q data table 105, a sub-Q data processing section 106, an audio data storage buffer 107, an audio processing section 108 and a switch 109. A denotes digital audio input data. Each of B, C, D, E and F denotes sub-Q data. Each of G, H and I denotes audio data. J denotes digital audio output data. K denotes analog audio output data. L denotes a threshold control signal. M denotes audio-processed digital audio output data. N denotes a digital audio output switching control signal.

The data receiving section 103 extracts audio data G and sub-Q data B from digital audio input data A. The input processing section 104 manages data storage into the sub-Q data table 105 and the audio data storage buffer 107. The audio processing section 108 performs audio processing to audio data stored in the audio data storage buffer 107. The sub-Q data processing section 106 performs the operation of synchronizing sub-Q data stored in the sub-Q data table 105 with audio data and then outputting synchronized data.

The switch 109 selects, as digital audio output data J, audio-processed data M or audio input data A. Thus, when input data for a digital audio output has to be output as it is in dubbing or the like, appropriate data handling can be performed. Moreover, a control signal N from the control section 101 makes the switch 109 changeable, so that the audio input data A can be output as the digital audio output data J, while data which has been audio-processed in the audio processing section 108 can be output as analog audio output data K which is to be a speaker output.

Figure 2:
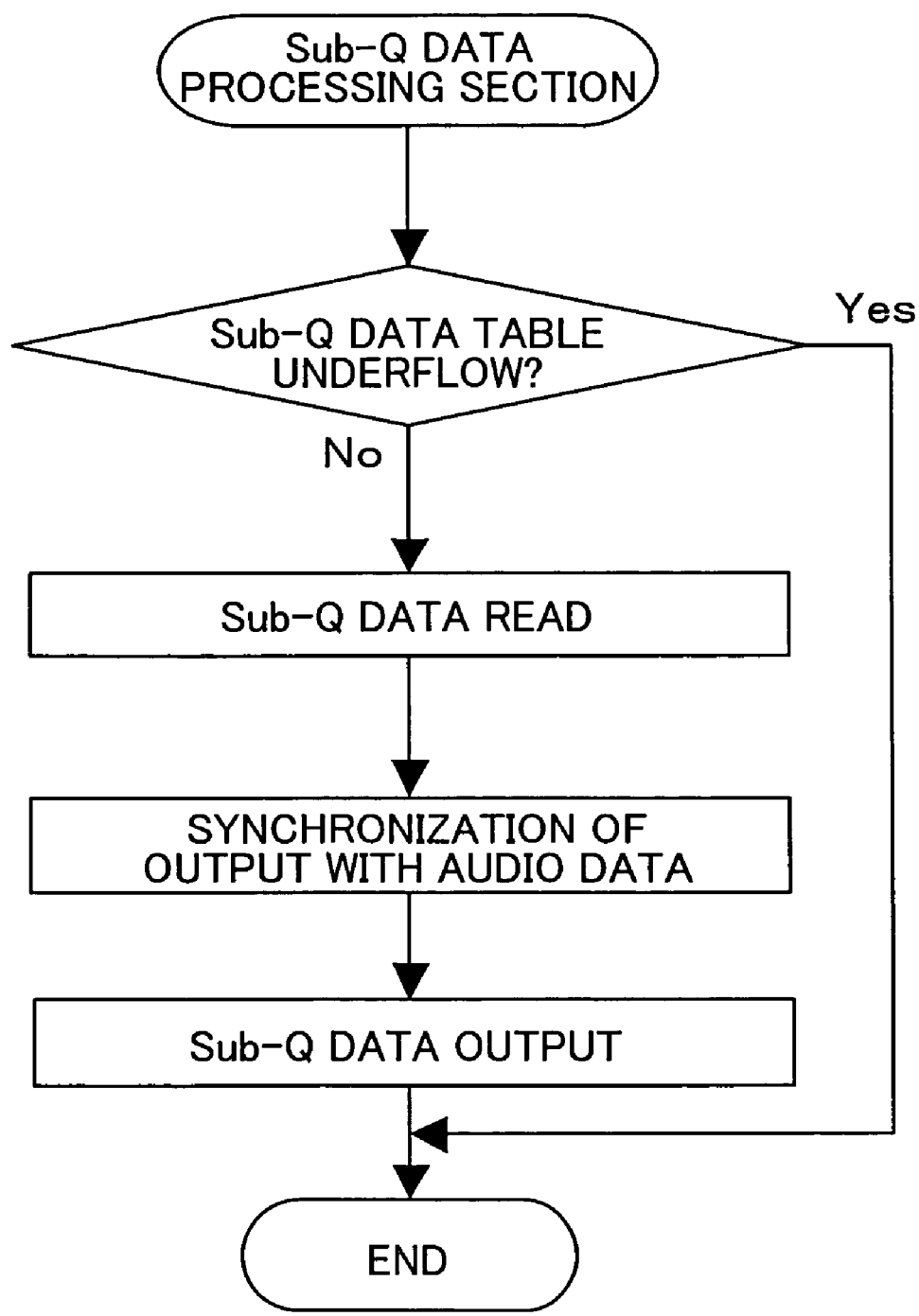
FIG. 2 is a flowchart of respective operations of a sub-Q data processing section in FIG. 1.

FIG. 2 is a flowchart of respective operations of the sub-Q data processing section 106 in FIG. 1. If underflow of the sub-Q data table 105 is detected, the sub-Q data processing section 106 does not perform sub-Q data reading. Thus, even when sub-Q data is not received, normal reproduction can be preformed without imposing influences of sound deterioration or the like on an audio data output.

Figure 3:
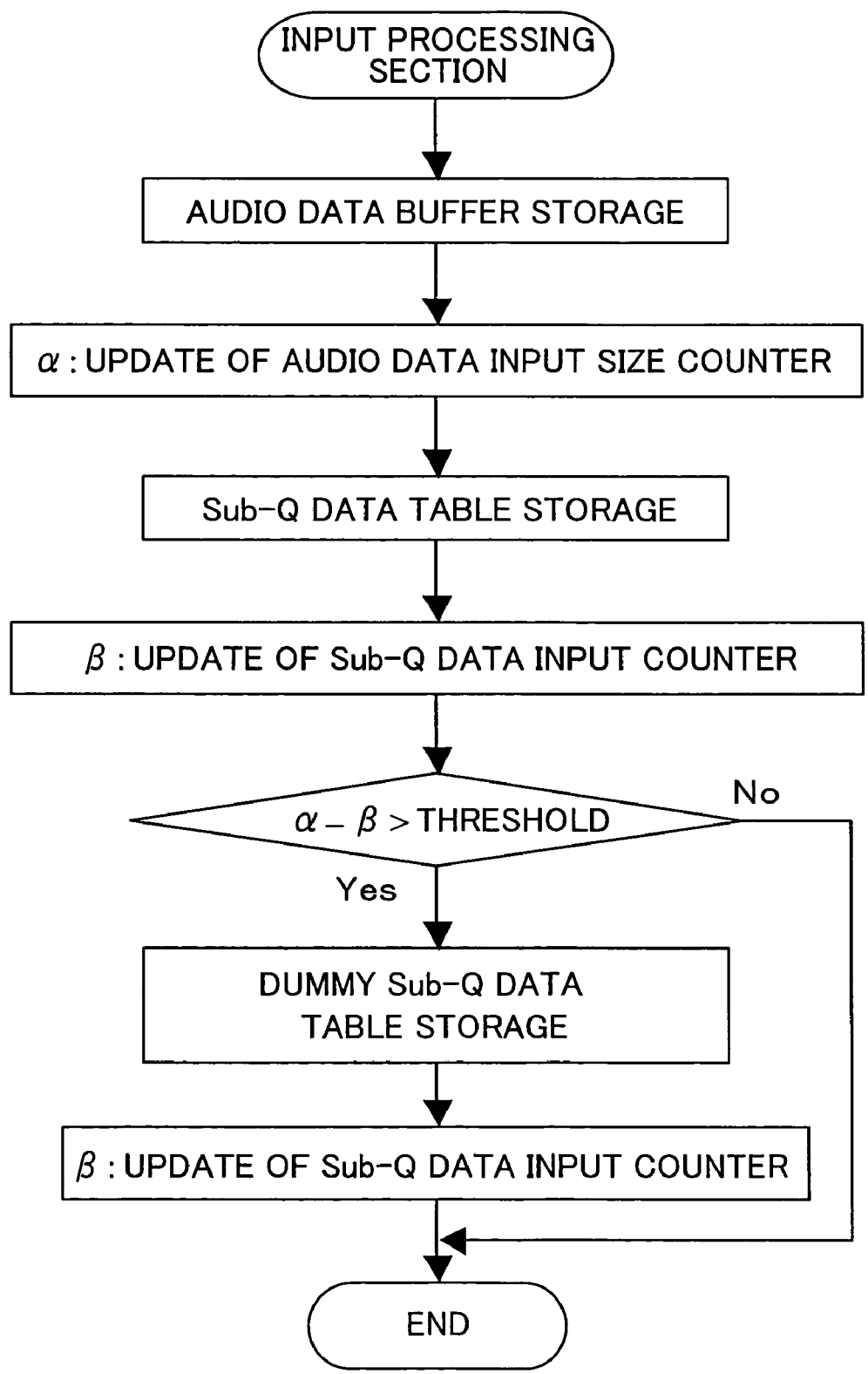
FIG. 3 is a flowchart of respective operations of underflow suppression of a sub-Q data table by an input processing section in FIG. 1

FIG. 3 is a flowchart of respective operations of underflow suppression of the sub-Q data table 105 by the input processing section 104 in FIG. 1. In the input processing section 104, audio data is stored in the buffer 107 and then an audio data input size counter is updated. Thereafter, a received sub-Q data is stored in the sub-Q data table 105. The audio data input size counter and a sub-Q data input number counter are used, in management for audio data and sub-Q data, to determine whether there is a difference between respective amounts of received audio data and the number of received sub-Q data. A difference between the two counters is checked, and then, if the amount of a sub-Q data input is smaller than the amount of an audio data input, a dummy sub-Q data is stored in the sub-Q data table 105 to achieve consistency of the amount of the sub-Q data input with the amount of the audio data input. Thus, underflow of the sub-Q data table 105 can be prevented, so that normal reproduction can be performed without imposing influences of sound deterioration or the like on an output of the audio data.

Figure 4:
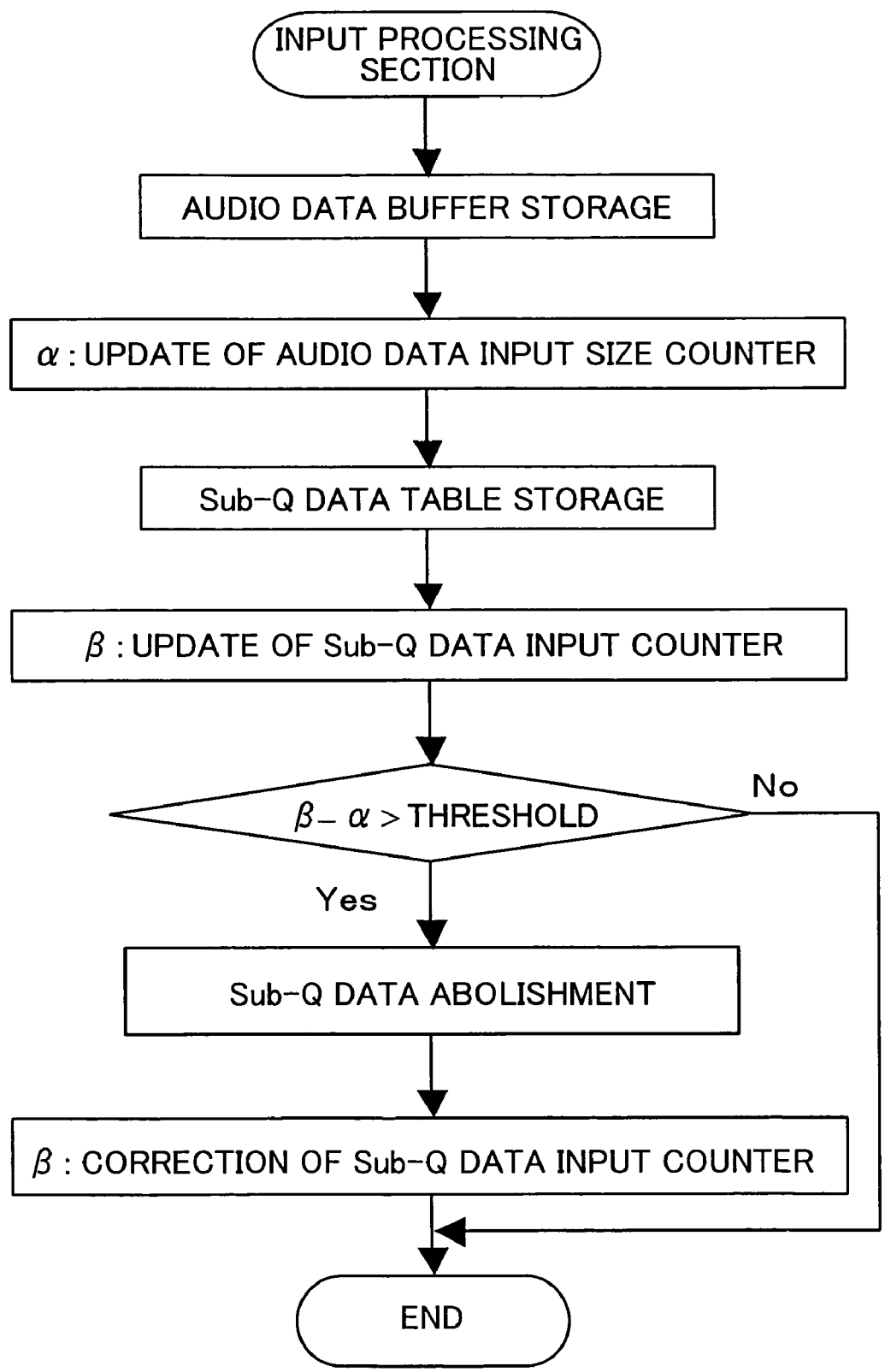
FIG. 4 is a flowchart showing respective operations of overflow suppression in a sub-Q data table by an input processing section in FIG. 1.

FIG. 4 is a flowchart of respective operations of overflow suppression in the sub-Q data table 105 by the input processing section 104 in FIG. 1. The input processing section 104 checks a difference between the audio data input size counter and the sub-Q data input number counter. Then, if the amount of the audio data input is smaller than the amount of the sub-Q data input, sub-Q data is abolished to achieve consistency of the data amount of the sub-Q data with the audio data. Thus, the overflow of the sub-Q data table 105 can be prevented, so that normal reproduction can be performed without imposing influences of sound deterioration or the like on an output of the audio data.

The input processing section 104 preferably includes an interface capable of receiving a threshold used in storage judgment for the sub-Q data table 105 described with FIG. 3 and FIG. 4 as a control signal L from the control section 101. Thus, the threshold can be changed according to respective sizes of the audio data storage buffer 107 and the sub-Q data table 105, so that the threshold can be specified to an optimum value according to a system.

Figure 5:
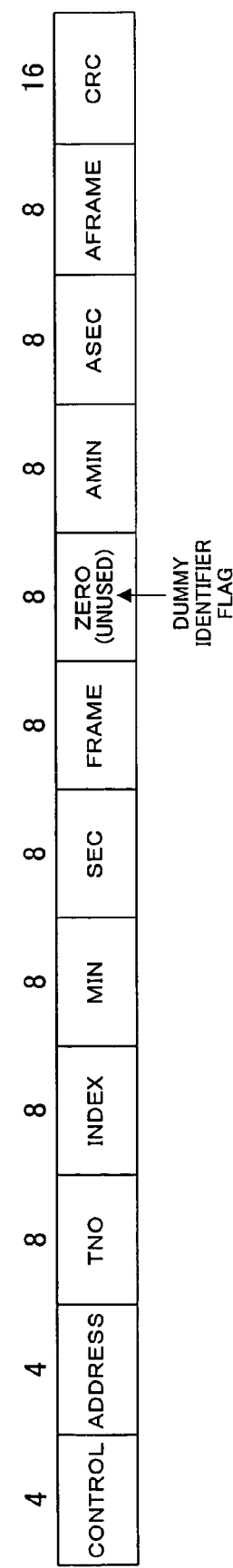
FIG. 5 is a conceptual illustration showing an example of dummy identifier flag insertion position in sub-Q data.

To make the dummy data inserted in the course of management of the sub-Q data table 105 in the operation flow of FIG. 3 identifiable in the sub-Q data processing section 106, as shown in FIG. 5, a dummy identifier flag is inserted in an unused region in sub-Q data. The sub-Q data of FIG. 5 includes a CONTROL region (4 bits), an ADDRESS region (4 bits), a data region (72 bits) consisting of 9 eight-bit fields and a CRC region (16 bits). The data region is divided into a track number (TNO) section, an index (INDEX) section, an elapsed time (MIN) section, an elapsed time (SEC) section, an elapsed time (FRAME) section, a ZERO section, an absolute time (AMIN) section, an absolute time (ASEC) section and an absolute time (AFRAME) section. The dummy identifier flag is inserted into the ZERO section which consists of 8 bits (all 0s) and normally is an unused field. Thus, whether a dummy exists or not can be detected in the sub-Q data processing section 106, so that output of the dummy sub-Q data to the outside can be prevented.

Figure 6:
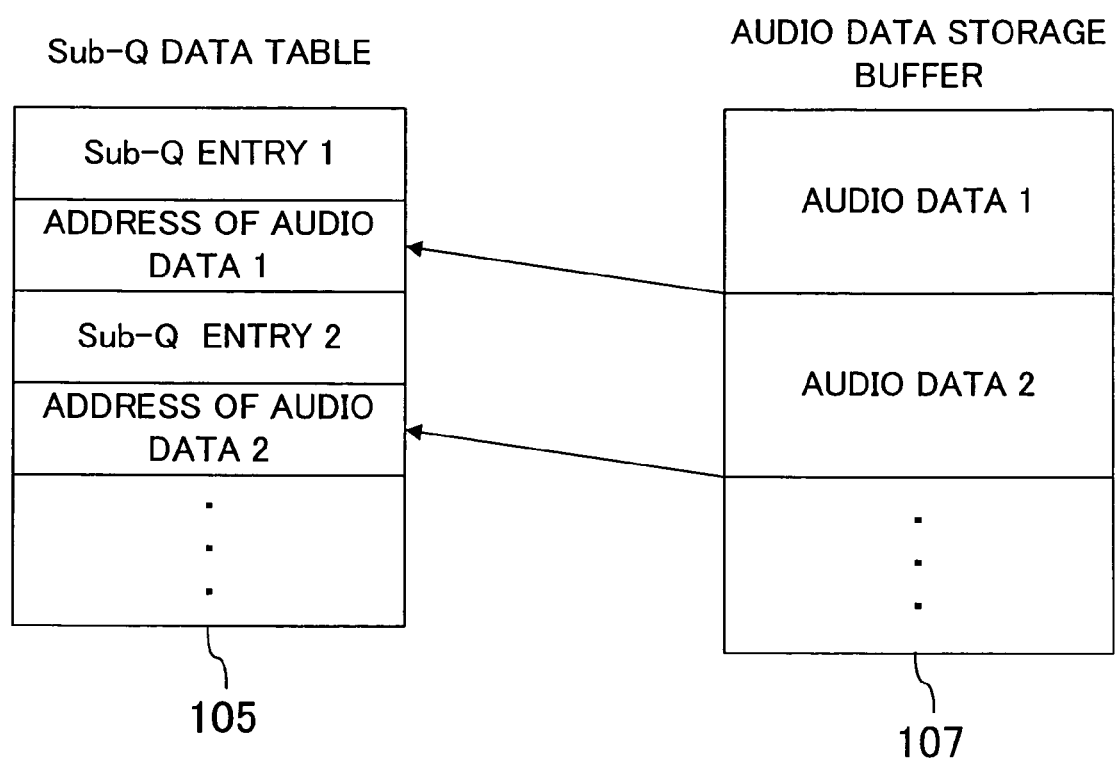
FIG. 6 is a diagram showing the relationship between the sub-Q data table and an audio data storage buffer in FIG. 1.

FIG. 6 is a diagram showing the relationship between the sub-Q data table 105 and the audio data storage buffer 107 in FIG. 1. When the sub-Q data is stored in the table 105 in the input processing section 104, an address of the audio data storage buffer 107 in which corresponding audio data is stored is also registered. The sub-Q data processing section 106 monitors current reproduction of audio data to identify a location of the currently reproduced audio data, and then makes comparison with audio data address information registered in the sub-Q data table 105, so that corresponding sub-Q data can be read without causing any time difference from the audio data in reading the sub-Q data.

As has been described, in an audio player according to the present invention, when data obtained by performing audio processing to external digital audio input data is output, sub-Q data can be output without sound deterioration. Moreover, the audio player has a mode in which an input is output as it is, and thus the audio player can be used for dubbing. Therefore, the audio player of the present invention is useful as an audio player having a variety of applications.

What is claimed is:

1. An audio player which has a function of audio-processing data from a digital input, extracting, simultaneously with audio processing, sub-Q data in user data to be digitally input, synchronizing the sub-Q data with audio data and then outputting the sub-Q data, the audio player comprising:

a reproduction section; and
   a control section for controlling the reproduction section, wherein the reproduction section includes
   a data receiving section for extracting audio data and sub-Q data from input data,
   a sub-Q data table for storing extracted sub-Q data,
   an audio data storage buffer for storing extracted audio data,
   an input processing section for managing storage of data into the sub-Q data table and the audio data storage buffer,
   an audio processing section for performing audio processing to the audio data stored in the audio data storage buffer, and
   a sub-Q data processing section for synchronizing the sub-Q data stored in the sub-Q data table with the audio data and then outputting the sub-Q data, and
   wherein the audio player has a function of automatically changing itself to a mode for outputting only the audio data when underflow of the sub-Q data table occurs.

2. The audio player of claim 1, wherein the audio player has a function of storing dummy sub-Q data in the sub-Q data table when in the input processing section, it is judged using an audio data input size counter and a sub-Q data input number counter that an amount of a sub-Q data input is smaller than an amount of an audio data input.

3. The audio player of claim 1, wherein the audio player has a function of not storing but abolishing the sub-Q data in the sub-Q data table when in the input processing section, it is judged using an audio data input size counter and a sub-Q data input number counter that an amount of a sub-Q data input is larger than an amount of an audio data input.

4. The audio player of claim 1, further comprising an interface capable of externally specifying, when in the input processing section, dummy sub-Q data is stored or abolished using an audio data input size counter and a sub-Q data input number counter, a threshold of a difference between the audio data input size counter and the sub-Q data input number counter.

5. The audio player of claim 1, wherein the audio player has a function of inserting, when in the input processing section, dummy sub-Q data is stored, a flag identifying the dummy sub-Q data in an unused region in the sub-Q data.

6. The audio player of claim 1, wherein the audio player has a function of storing, when sub-Q data is stored in the sub-Q data table, an address of the audio data storage buffer storing corresponding audio data with the sub-Q data in the sub-Q data table.

7. The audio player of claim 1, further comprising a switch for changing between a mode in which audio processing is performed to the audio data extracted in the data receiving section, the audio data is synchronized with the extracted sub-Q data and the audio data is digitally output and a mode in which digital input data is digitally output as it is.

8. The audio player of claim 1, further comprising an interface capable of changing between a mode in which audio processing is performed to the audio data extracted in the data receiving section, the audio data is synchronized with the extracted sub-Q data and the audio data is digitally output and a mode in which digital input data is digitally output as it is.

* * * * *